United States Patent
Kojima

(10) Patent No.: US 11,656,815 B2
(45) Date of Patent: May 23, 2023

(54) PRINTING SYSTEM, PRINTING APPARATUS, AND MANAGEMENT SERVER

(71) Applicant: CANON KABUSHIKI KAISHA, Tokyo (JP)

(72) Inventor: Ryoko Kojima, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/382,409

(22) Filed: Jul. 22, 2021

(65) Prior Publication Data
US 2022/0050646 A1 Feb. 17, 2022

(30) Foreign Application Priority Data
Aug. 11, 2020 (JP) .............................. JP2020-135739

(51) Int. Cl.
G06F 3/12 (2006.01)
(52) U.S. Cl.
CPC ............ *G06F 3/1219* (2013.01); *G06F 3/121* (2013.01); *G06F 3/1239* (2013.01); *G06F 3/1255* (2013.01); *G06F 3/1288* (2013.01)
(58) Field of Classification Search
None
See application file for complete search history.

(56) References Cited

U.S. PATENT DOCUMENTS

2010/0118340 A1* 5/2010 Yamada ................ G06F 3/1288
358/1.15
2021/0303234 A1* 9/2021 Fukusada .............. G06F 3/1204

FOREIGN PATENT DOCUMENTS

JP 2016-193592 A 11/2016

* cited by examiner

*Primary Examiner* — Fan Zhang
(74) *Attorney, Agent, or Firm* — Venable LLP

(57) ABSTRACT

A printing system restricts printing performed by a printing apparatus in a case where predetermined information, representing a printing amount of the printing by utilizing a consumable part, reaches a set 1st value during printing in a state where communication between a server and the printing apparatus is impossible, and the server outputs a 2nd value, which is different from the 1st value, to the printing apparatus in a state where the communication with the printing apparatus is possible. If the 2nd value is input from the server, the printing apparatus restricts the printing in a case where the predetermined information reaches the 2nd value during printing in a state where the communication with the server is impossible, and in a case where a time period related to maintenance of the server is input, the server outputs the 2nd value to the printing apparatus, based on the time period.

14 Claims, 11 Drawing Sheets

PRINTING SYSTEM, PRINTING APPARATUS, AND MANAGEMENT SERVER

BACKGROUND OF THE INVENTION

Field of the Invention

The present invention relates to a printing system, in which a printing apparatus that performs printing with consumption of a consumable part is managed by a management server, with the printing apparatus and the management server used in the printing system.

Description of the Related Art

Conventionally, for a printing apparatus such as an inkjet printing apparatus and a copier, there is a flat-rate service with which the user periodically pays a fixed fee to a management company that manages the apparatus in order to receive services such as utilizing various kinds of consumable parts and ordering various kinds of consumable parts. In such a flat-rate service, there is a case in which the number of printing sheets is output from the printing apparatus to the management server that manages the printing apparatus via a network. Therefore, it is desirable that the printing apparatus is always in an online state where communication with the management server is possible.

In Japanese Patent Laid-Open No. 2016-193592, there is disclosed a technique with which the utilization in an offline state can be reflected in a case of utilizing a flat-rate service which is desirably utilized in an online state. Specifically, the number of printing sheets is stored in a case where printing is performed by a printing apparatus in an offline state in which the printing apparatus cannot communicate with the management server, and, when the printing apparatus is turned into an online state, the number of printing sheets is output to the management server.

As described in Japanese Patent Laid-Open No. 2016-193592, it is assumed that a printing apparatus performs printing in an offline state. In this case, there is a case in which it is desired to manage the printing in the offline state as well.

SUMMARY OF THE INVENTION

The present invention has been made in view of the above-described problems and provides a technique with which printing by a printing apparatus in an offline state can be appropriately managed.

In the first aspect of the present invention, there is provided a printing system including:
a printing apparatus configured to perform printing by utilizing a consumable part; and
a server configured to manage the printing apparatus,
wherein the printing system restricts printing performed by the printing apparatus in a case where predetermined information, which represents a printing amount of the printing by utilizing the consumable part, reaches a set 1st value during printing in a state where the communication between the server and the printing apparatus is impossible,
wherein the server outputs a 2nd value, which is different from the 1st value, to the printing apparatus in a state where the communication with the printing apparatus is possible, and
wherein, if the 2nd value is input from the server, the printing apparatus restricts the printing in a case where the predetermined information reaches the 2nd value during printing in a state where the communication with the server is impossible.

In the second aspect of the present invention, there is provided a printing apparatus including,
a performing unit configured to perform printing by utilizing a consumable part, and to restrict printing in a case where predetermined information, which represents a printing amount of the printing by utilizing the consumable part, reaches a set 1st value,
an obtaining unit configured to a 2nd value, which is greater than the 1st value, from a server in a state where the communication with the server is possible, and
a restricting unit configured to, during printing in a state where the communication with the server is impossible, restrict the printing in a case where the predetermined information reaches the 2nd value.

In the third aspect of the present invention, there is provided a management server including,
a managing unit configured to manage the printing apparatus that performs printing by utilizing a consumable part and restricts printing in a case where predetermined information, which represents a printing amount utilizing the consumable part, reaches a set 1st value during printing in a state where the communication is impossible, and
an output unit configured to output a 2nd value, which is different from the 1st value and for updating the 1st value that is set for the predetermined information, to the printing apparatus in a state where the communication with the printing apparatus is possible.

According to the present invention, it is possible to appropriately manage printing by a printing apparatus in an offline state.

Further features of the present invention will become apparent from the following description of exemplary embodiments with reference to the attached drawings.

DESCRIPTION OF THE EMBODIMENTS

Figure 1:
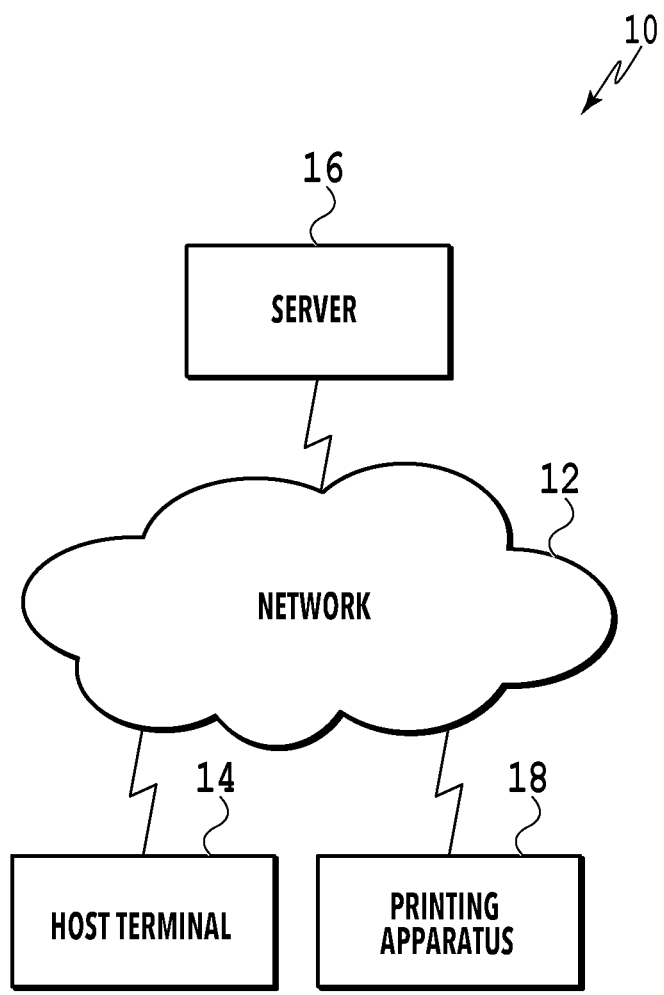
FIG. 1 is a block configuration diagram of a printing system according to the present embodiments.

Hereinafter, an example of the printing system according to the present embodiments will be explained in detail with reference to the attached drawings. Note that it is not intended that the following embodiments limit the present invention, and every combination of the characteristics explained in the present embodiments is not necessarily essential to the solution in the present invention. In addition, unless otherwise specified, the relative positions, shapes, etc., of the constituent elements described in the present embodiments are merely examples and are not intended to limit the range of the present invention as such. Note that, in the following embodiments, recording on a print medium such as printing paper will be described as printing on a print medium. Further, an apparatus that performs such recording is referred to as a printing apparatus.

In a case of being in an online state where communication with a server is possible, the printing apparatus of the present embodiments sends printing information, which includes the number of printing sheets, to the server. On the other hand, although the printing apparatus can perform printing even in an offline state, the upper limit number of sheets is set for the printing in the offline state. Specifically, in a case of a flat-rate service with a printing upper limit of 50 printing sheets per month, it is possible to perform printing on up to 25 sheets in the offline time, and, once the number of printing sheets reaches 25, the printing in the offline state will be restricted. That is, a number that is smaller than the upper limit number of sheets per month in the online state will be set. Alternatively, printing can be performed on up to 100 sheets in the offline time, that is, it is also possible that a number that is greater than the upper limit number of sheets per month in the online state will be set.

In the following embodiments, the upper limit number of sheets for the printing apparatus to perform printing in the offline state is set by a server in advance when the printing apparatus is in the online state. Therefore, the upper limit number of sheets for the offline state can be easily changed as compared with a case where a fixed value is internally set for the printing apparatus as the upper limit number of sheets for the offline state, for example.

Therefore, for example, in a case where the printing apparatus is turned into the offline state due to maintenance of the server, the printing upper limit number of sheets for the offline state can be set according to the expected time period of the maintenance. As described above, according to the following embodiments, it is possible to perform more flexible and appropriate management for printing in the offline state.

Note that, in the following embodiments, the above-described number of printing sheets is counted by the printing apparatus. The number of printing sheets may be the number of print sheets to be used for printing or may be the number of pages in the data of printing targets. In the print settings, there is double-side printing in which different pages are printed on the respective sides of one sheet of printing paper, and there is "N-in-1 printing" in which data of multiple pages is printed on one sheet of printing paper. In a case where the number of printing sheets is the number of printing paper and such a print setting as described above is performed, the number of printing sheets, which is less than the number of pages in the date of a printing target, will be counted by the printing apparatus.

First Embodiment

First, with reference to FIG. 1 through FIG. 7, an explanation will be given of the printing system according to the first embodiment. FIG. 1 is a block configuration diagram of the printing system according to the embodiments.

Configuration of the Printing System

The printing system 10 includes the host terminal 14, the server 16, and the printing apparatus 18 that are connected to each other in a communicable manner via the network 12. The host terminal 14 outputs an instruction for printing and various kinds of information to the printing apparatus 18. Note that the host terminal 14 is not limited to the form of being connected to the printing apparatus 18 via the network 12 and may be configured to be directly connected to the printing apparatus 18, not via the network 12. Note that the server 16 may be configured with one server device, or it is also possible that a server system in which multiple server devices are linked operates as the server 16.

Further, for example, the host terminal 14 is used for making a contract for a flat-rate service for the user to utilize a consumable part of the printing apparatus 18 at a fixed rate periodically with a management company that manages the flat-rate service via the server 16. Specifically, the host terminal 14 holds information related to the printing apparatus 18, and the input user information and information related to the printing apparatus 18 are output from the host terminal 14 to the server 16 at the time of making a contract for a flat-rate service. Note that, for example, the information related to the printing apparatus 18 is information that specifies the printing apparatus 18. Further, for example, information related to a contract for various kinds of services provided by a management company, which manages a flat-rate service, is output from the server 16 to the host terminal 14. Note that the host terminal 14 may hold the information related to the printing apparatus 18 as described above, or it is also possible that the host terminal 14 obtains the information from the printing apparatus 18 in a case where the user instructs the host terminal 14 for utilizing a flat-rate service. The host terminal 14 is connected to the printing apparatus 18 by a wired connection such as USB or a wired LAN or by a wireless connection such as a wireless LAN, so that the host terminal 14 obtains the above-described information from the printing apparatus 18 via such a connection.

The server 16 is managed by a management company that provides a flat-rate service and is a management server that manages the printing apparatus 18 and users who utilize the flat-rate service. In addition, various kinds of information are exchanged with the host terminal 14, in order to process a contract for a flat-rate service. Further, the server 16 outputs, to the printing apparatus 18, the first value (1st value) to be set as the number of printing sheets that is printable in a case where the printing apparatus 18 is turned into the offline state where communication with the server 16 cannot be performed. Furthermore, when it is known in advance that the printing apparatus 18 will be turned into the offline state due to maintenance of the server 16, extension of server devices, etc., the server 16 outputs, to the printing apparatus 18, the second value for updating the number of printing sheets that is printable in the offline state. Note that the second value (2nd value) may be set greater than the first value or smaller than the first value. The first value and the second value are values associated with a flat-rate service. For example, in a case where there are multiple flat-rate services having different service contents, the values are different depending on the types of the flat-rate services.

Configuration of the Printing Apparatus

The printing apparatus 18 executes printing based on image data, based on a job which is output from the host terminal 14. In the present embodiment, the printing apparatus 18 is an inkjet printing apparatus that ejects ink onto a print medium for printing. Note that the printing apparatus 18 is not limited to an inkjet printing apparatus, and any printing method may be used as long as the printing apparatus 18 is a printing apparatus that consumes a consumable part for printing. For example, a printing apparatus that uses toner as a consumable part for printing may be used.

Figure 2:
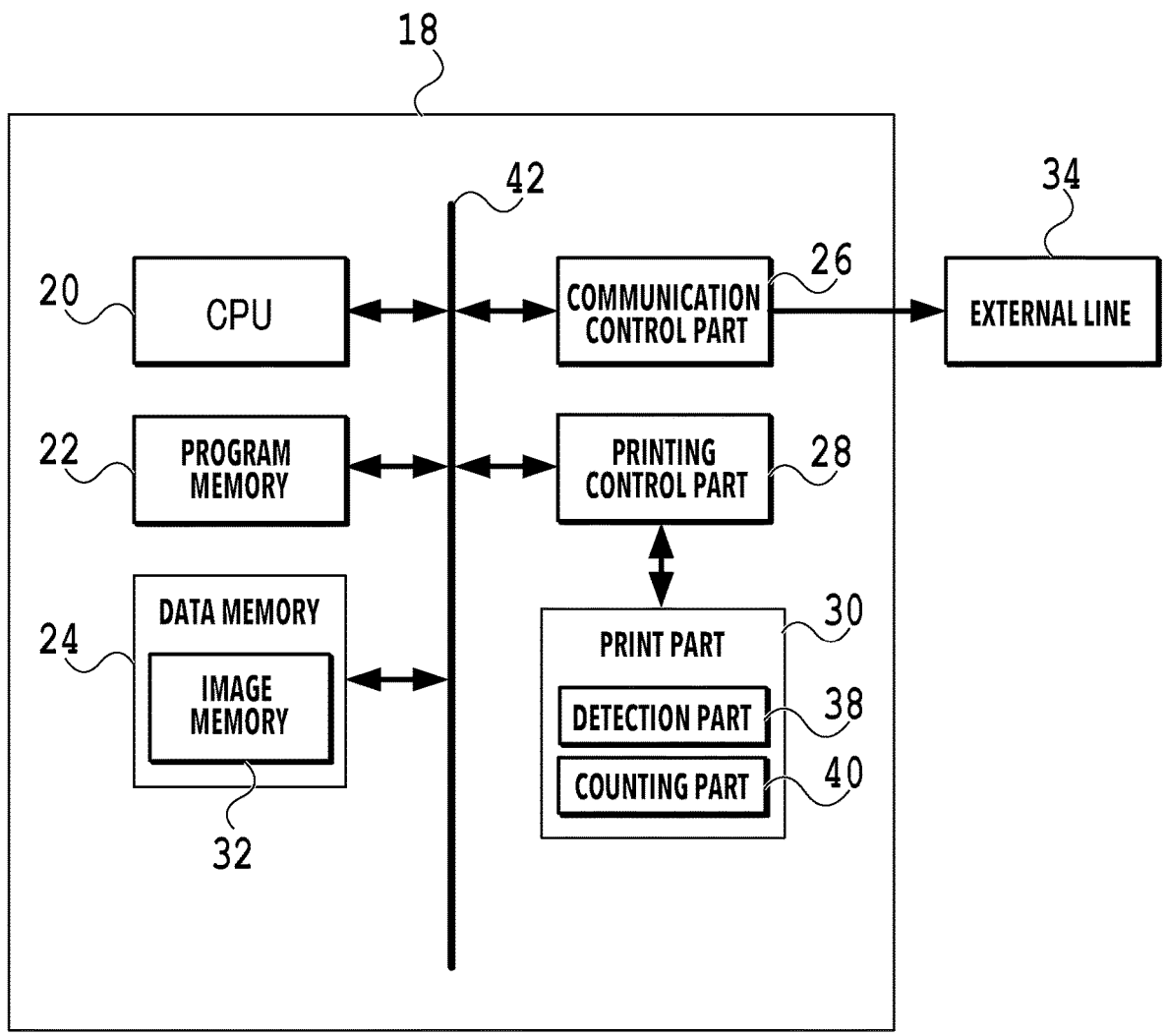
FIG. 2 is a block configuration diagram of a printing apparatus.

FIG. 2 is a block configuration diagram of a printing apparatus. The printing apparatus 18 includes the CPU 20, the program memory 22, the data memory 24, the communication control part 26, the printing control part 28, and the print part 30. Each of these configurations is connected to each other via the bus 42 managed by the CPU 20.

The CPU 20 is a system control part, which controls the entire printing apparatus 18. The program memory 22 stores a control program to be executed by the CPU 20, an embedded operating system (OS) program, etc. The data memory 24 includes the image memory 32 that holds image data. Further, the data memory 24 stores various kinds of information, such as a program control variable, and is equipped with various kinds of work buffer areas to be utilized for the processing performed by the printing control part 28. The communication control part 26 controls transmission and reception of data with a device, which is connected to the outside via the external line 34 or the network 12. The printing control part 28 obtains data for printing from the image memory 32, in which the image data processed by an image processing part (not illustrated in the drawings) is accumulated, and controls the printing performed by the print part 30.

The print part 30 performs printing under the control by the printing control part 28. The print part 30 includes the detection part 38, which can detect that the mounted cartridge (a cartridge that contains ink to be used for recording) is a cartridge dedicated to a flat-rate service, and the counting part 40 that counts the number of printing sheets. Further, it is also possible that the print part 30 is equipped with a configuration capable of detecting the remaining amount of ink in a cartridge, the consumption of ink consumed by printing, etc.

The printing apparatus 18 outputs obtained printing information to the server 16. The printing information is a log, in which a job mode such as copy or print, the number of printing sheets, and the printing result are summarized, and is generated for each job. Note that, in a case of being equipped with a configuration that detects the remaining amount of a cartridge and the consumption of ink, such a detection result may be included in the printing information. As for the output of the printing information, the printing information is output by the CPU 20 or the printing control part 28 via the communication control part 26. For example, the printing information is stored in the data memory 24.

Contract Processing

Figure 3:
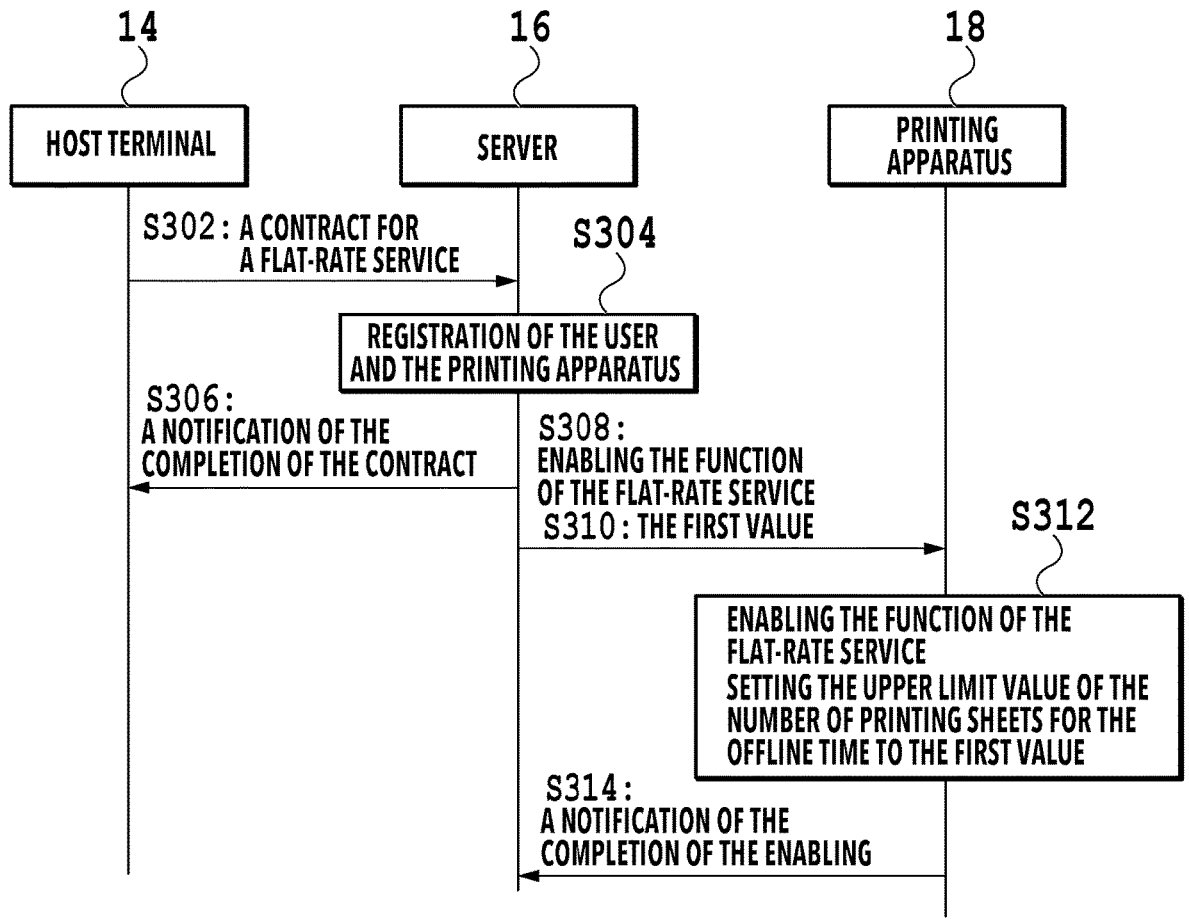
FIG. 3 is a sequence diagram of contract processing in the first embodiment.

With the above configurations, in the printing system 10, the user makes a contract for utilizing a flat-rate service with a management company by use of the host terminal 14. FIG. 3 is a sequence diagram of contract processing for making a contract for a flat-rate service. Note that the symbol "S" in the explanation of each process means that it is a step in the sequence.

First, the host terminal 14 sends information which is input by the user for making a contract for a flat-rate service to the server 16 (S302). Specifically, in S302, various kinds of information are repeatedly exchanged between the host terminal 14 and the server 16. As for the various kinds of information to be exchanged, there are user information, information related to the printing apparatus 18, plan information of the flat-rate service, etc., as contract information for making a contract for the flat-rate service.

Next, the server 16 registers the user and the printing apparatus 18, based on the contract information (S304). That is, the server 16 registers the user information and the information related to the printing apparatus 18 as a target that can receive the flat-rate service. Thereafter, the server 16 notifies the host terminal 14 that the contract for utilizing the flat-rate service is completed (S306). Further, to the printing apparatus 18, the server 16 outputs a command for enabling the function of the flat-rate service (S308) and outputs the number of printing sheets that is printable in the offline state (S310). That is, in S310, the server 16 outputs, to the printing apparatus 18, the first value which is set as the number of printing sheets that can be printed by the printing apparatus 18 in the offline state.

Then, the printing apparatus 18 enables the function of the flat-rate service, based on the input information, and further sets the upper limit value of the number of printing sheets for the offline time (S312) and provides the server 16 with a notification that the enabling of the function of the flat-rate service is completed (S314). That is, in S312, for example, the usage mode of the printing apparatus 18 is changed from the normal mode, in which printing is performed by use of a commercially-available cartridge, to the service mode, in which printing is performed by use of a cartridge dedicated to the flat-rate service. Further, the upper limit value of the number of printing sheets that can be printed by the printing apparatus 18 in the offline state is set to the first value which is input from the server 16. Note that the upper limit value is stored in the data memory 24, for example. Accordingly, in a case where the number of printing sheets in the offline state reaches the upper limit value, which is set to the first value, the printing apparatus 18 is restricted from printing by the flat-rate service. Note that, in the following explanation, the upper limit value of the number of printing sheets for the offline time, which is set for the printing apparatus 18, is simply referred to as the "upper limit value" as appropriate.

Print Processing

Figure 4:
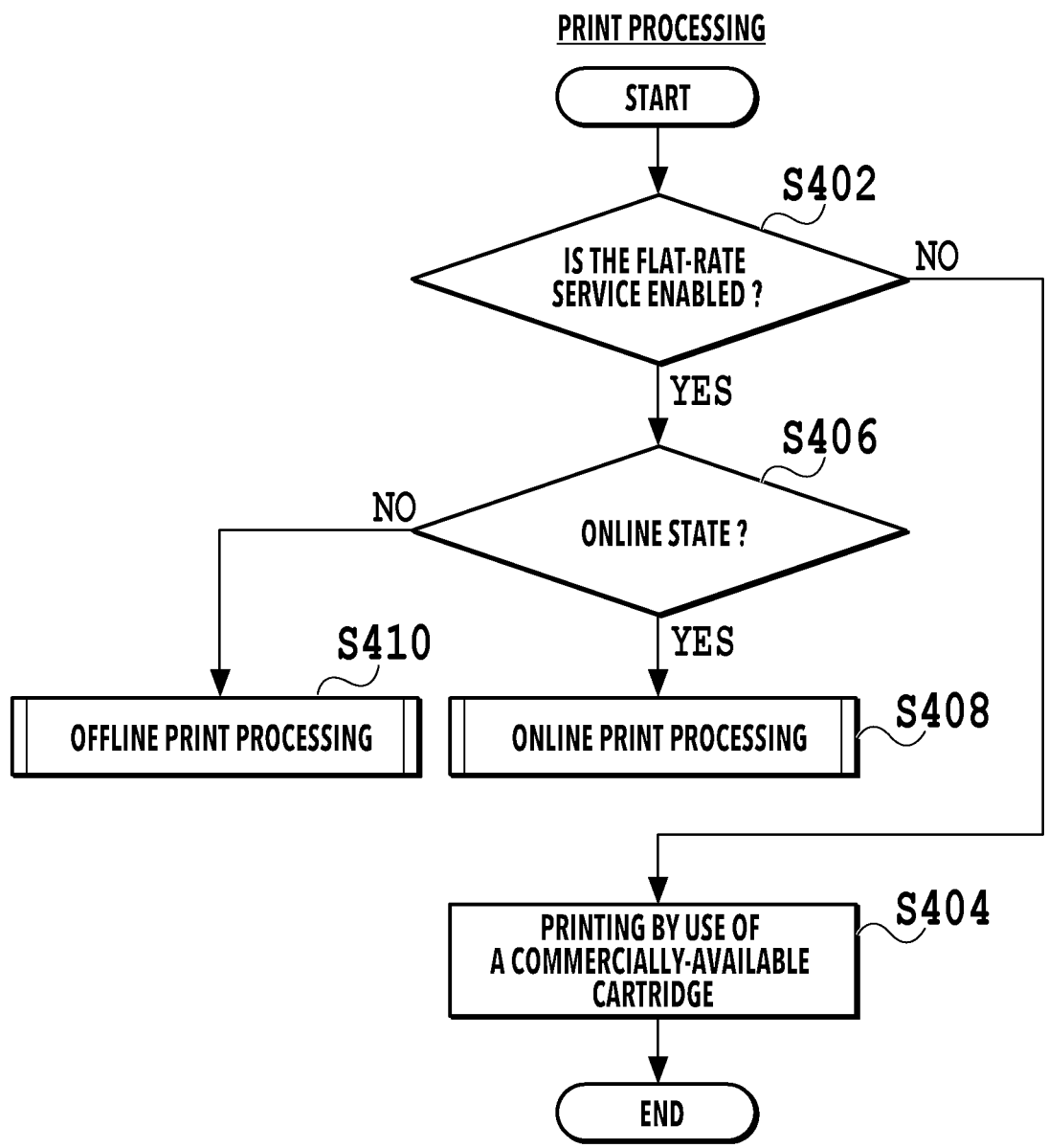
FIG. 4 is a flowchart of print processing in the first embodiment.
Figure 5:
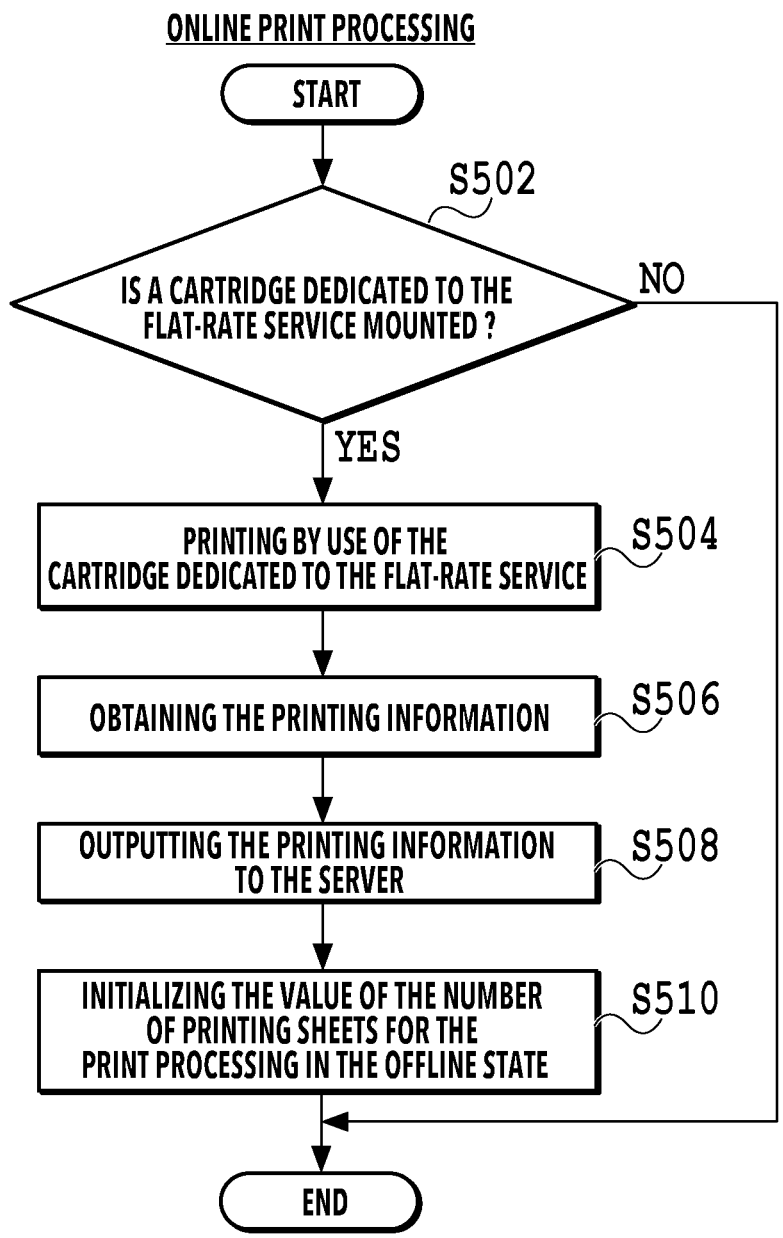
FIG. 5 is a flowchart of online print processing, which is a subroutine of the print processing of FIG. 4.
Figure 6:
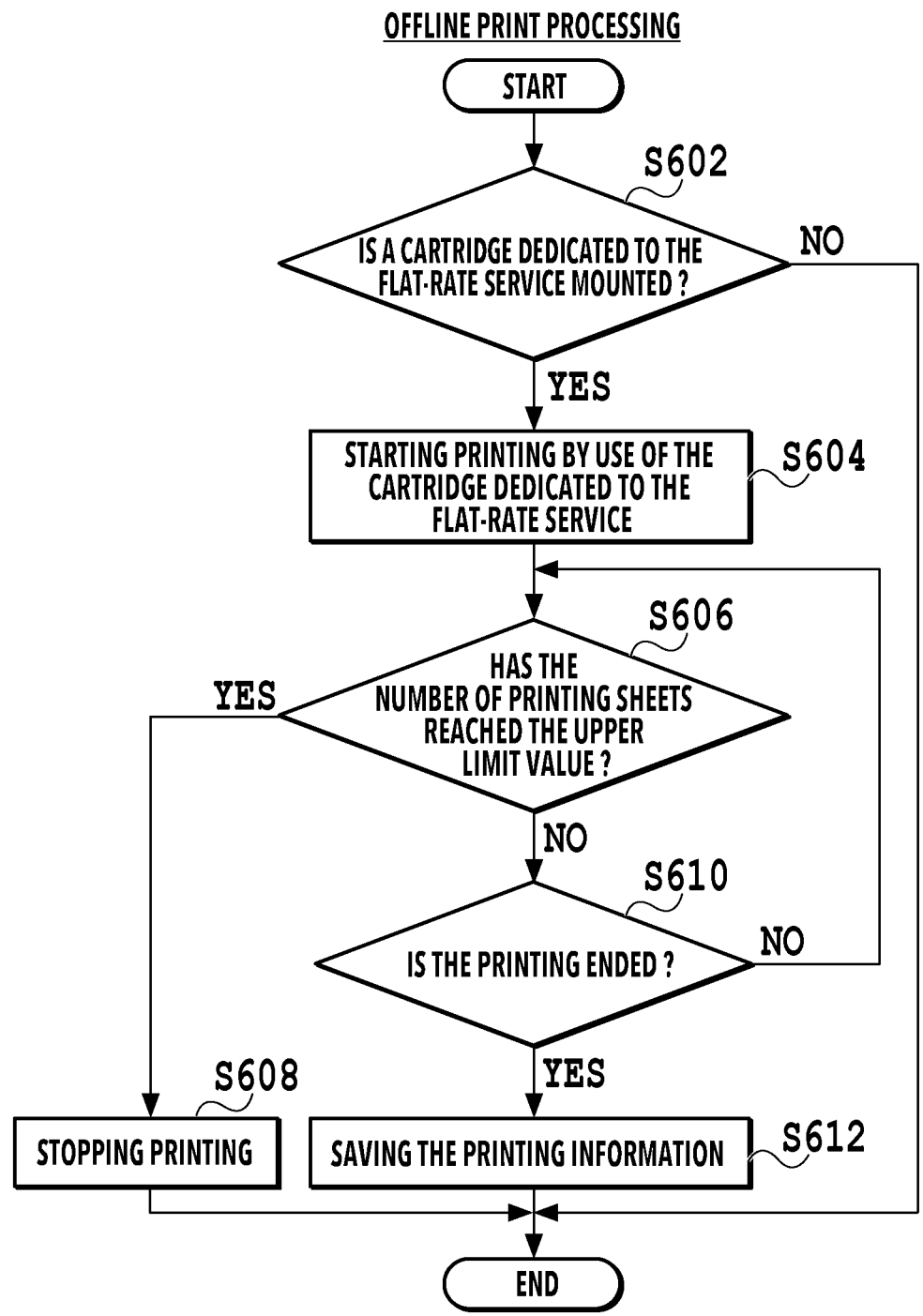
FIG. 6 is a flowchart of offline print processing, which is a subroutine of the print processing of FIG. 4.

Further, in the printing system 10, the print processing will be started in a case where an instruction for starting printing based on a job is provided from the host terminal 14 to the printing apparatus 18. FIG. 4 is a flowchart illustrating a detailed processing routine of the print processing to be executed in a printing apparatus. In addition, FIG. 5 is a flowchart illustrating the details of the online print processing, which is a subroutine of the print processing of FIG. 4. Further, FIG. 6 is a flowchart illustrating the details of the offline print processing, which is a subroutine of the print processing of FIG. 4. The series of the processes illustrated in the flowcharts of FIGS. 4, 5, and 6 are performed by the CPU 20 loading a program code recorded in the program memory 22 into the data memory 24 and executing the program code. Alternatively, a part or all of the functions in the steps of FIGS. 4, 5, and 6 may be executed by hardware such as an ASIC or an electronic circuit. Note that the sign "S" in the explanation of each process means that it is a step of the flowchart.

When the print processing is started, the CPU 20 firstly determines whether or not the function of the flat-rate service function is enabled (S402). That is, in S402, the CPU 20 determines, for example, whether or not the setting of the usage mode is the service mode. Then, if the usage mode is the service mode, it is determined that the function of the flat-rate service is enabled, and, if the usage mode is the normal mode, it is determined that the function of the flat-rate service is not enabled. Note that, in the present embodiment, in a case where a contract for a flat-rate service is made, the setting of the usage mode can be changed from the normal mode to the service mode in S402 of the above-described contract processing.

If it is determined in S402 that the function of the flat-rate service is not enabled, the CPU 20 performs printing by use of a commercially-available cartridge (S404) and ends this print processing. In S404, if the detection part 38 detects that a commercially-available cartridge is mounted, that is, detects a cartridge that is not the cartridge dedicated to the flat-rate service, the CPU 20 obtains data for printing from the image memory 32 and performs printing based on the data. Note that, if the detection part 38 detects that the mounted cartridge is a cartridge dedicated to the flat-rate service, for example, a notification that an appropriate cartridge is not mounted is provided, so that this print processing is ended.

Further, if it is determined in S402 that the function of the flat-rate service is enabled, the CPU 20 determines whether or not the printing apparatus 18 is in the online state, where communication with the server 16 is possible (S406). That is, in S406, for example, a signal for confirming as to whether or not the printing apparatus 18 is in the online state is output from the printing apparatus 18 via the communication control part 26. Then, if a signal indicative of being in the online state is input from the server 16, the CPU 20 determines that the printing apparatus 18 is in the online state. If the signal is not input for a predetermined time period, the CPU 20 determines that the printing apparatus 18 is not in the online state, that is, in the offline state. If it is determined in S406 that the printing apparatus 18 is in the online state, the online print processing will be executed (S408). Further, if it is determined in S406 that the printing apparatus 18 is not in the online state, the offline print processing will be executed (S410).

First, with reference to FIG. 5, the online print processing, which is a subroutine of the print processing, will be explained. If the online print processing of S408 is started, the CPU 20 firstly determines whether or not a cartridge dedicated to the flat-rate service is mounted (S502). That is, in S502, the CPU 20 determines whether or not a cartridge dedicated to the flat-rate service is mounted, based on a detection result from the detection part 38. Note that, in a case where multiple cartridges are mounted in the printing apparatus 18, for example, if it is detected that all of the multiple cartridges are cartridges dedicated to flat-rate services, it will be determined in S502 that a cartridge dedicated to the flat-rate service is mounted. Further, if it is detected that at least one of the multiple cartridges is not a cartridge dedicated to a flat-rate service, it will be determined in S502 that a cartridge dedicated to the flat-rate service is not mounted. Alternatively, it is also possible that, if it is detected that at least one of the multiple cartridges is a cartridge dedicated to a flat-rate service, it will be determined in S502 that a cartridge dedicated to the flat-rate service is mounted. In this case, if it is detected that all of the multiple cartridges are not a cartridge dedicated to a flat-rate service, it will be determined in S502 that a cartridge dedicated to the flat-rate service is not mounted.

If it is determined in S502 that a cartridge dedicated to the flat-rate service is not mounted, the online print processing will be ended with, for example, a notification that printing with the flat-rate service cannot be executed since a cartridge dedicated to the flat-rate service is not mounted. Thereby, the print processing is ended. Further, if it is determined in S502 that a cartridge dedicated to the flat-rate service is mounted, printing based on a job will be performed by use of the cartridge (S504). In S504, together with the start of printing, the counting part 40 starts counting the number of printing sheets. Note that, during the printing, the counting part 40 continues counting the number of printing sheets.

Upon completion of the printing, the CPU 20 then obtains the printing information (S506) and outputs this printing information to the server 16 (S508). Note that it is also possible that the printing information includes information related to each kind of consumable parts consumed in the printing of S504. Further, the number of printing sheets in the printing information obtained in S506 is a value of the sum of the number of printing sheets printed in S504 and the number of printing sheets in the offline print processing (which will be described later) stored in the data memory 24, for example. Note that the server 16 updates the value of the number of printing sheets that is associated with the printing apparatus 18, based on the printing information that is output from the printing apparatus 18. Note that the number of printing sheets in the offline print processing is the number of printing sheets printed in the offline print processing of S410.

Thereafter, the CPU 20 initializes the value of the number of printing sheets in the offline print processing stored in the data memory 24 (S510) and ends this online print processing. Thereby, the print processing is ended. It is also possible that the number of printing sheets in the offline print processing is stored in a storage area other than the data memory 24. Note that, although, in the online print processing, the print processing is ended if it is determined in S502 that a cartridge dedicated to the flat-rate service is not mounted, there is not a limitation as such. That is, it is also possible that printing utilizing a commercially-available cartridge will be executed if it is determined that a cartridge dedicated to the flat-rate service is not mounted. Here, it is also possible that the CPU 20 changes the usage mode of the printing apparatus 18 from the service mode for using the flat-rate service to the normal mode. Alternatively, it is also possible that the CPU 20 displays, on a display screen included in the printing apparatus 18, an inquiry screen for inquiring the user whether to change the usage mode to the normal mode or to mount a cartridge dedicated to the flat-rate service. In this case, if an instruction for changing the mode is provided by the user on the inquiry screen, the CPU 20 will change the usage mode to the normal mode. On the other hand, if an instruction for mounting a cartridge dedicated to the flat-rate service is provided, the process of S502 will be executed again.

Note that, in this online print processing, after the process of S510, it is also possible that the server 16 determines whether or not the printing with the flat-rate service can be continued. That is, the server 16 determines whether or not the limit of the number of printing sheets for which the flat-rate service can be utilized has been reached, based on the received printing information, and, if it is determined that the limit has been reached, the server 16 outputs an instruction for cancelling the utilization of the flat-rate service to the printing apparatus 18. Further, if the printing apparatus 18 receives the instruction for cancelling the utilization of the flat-rate service, for example, the printing apparatus 18 performs a process for disabling the flat-rate service, so that the printing with the flat-rate service cannot be executed. Here, it is also possible that the CPU 20 of the printing apparatus 18 displays, on the display screen of the printing apparatus 18, a notification that further printing is possible with payment of an additional fee or utilization of a service of a higher-level plan. Then, the user accesses the server 16 by use of the host terminal 14 or the like and provides the server 16 with an instruction indicating that the user agrees to pay the additional fee or shift to a higher-level plan. Then, in the server 16, a new greater number of printing sheets is set as the upper limit of the number of printing sheets to be printed by the printing apparatus 18 in the online state. It is also possible that the printing apparatus 18 will be thereby able to perform printing in the online state until the new upper limit number of sheets is reached.

Next, with reference to FIG. 6, the offline print processing, which is a subroutine of the print processing, will be explained. If the offline print processing of S410 is started, the CPU 20 firstly determines whether or not a cartridge dedicated to the flat-rate service is mounted (S602). Note that, since the specific details of processing of S602 are the same as those of S502 described above, the detailed explanations thereof will be omitted. If it is determined in S602 that a cartridge dedicated to the flat-rate service is not mounted, this offline print processing will be ended with, for example, a notification that printing cannot be performed since a cartridge dedicated to the flat-rate service is not mounted. Thereby, the print processing is ended. Note that, as with the print processing in the online state, it is also possible that printing utilizing a commercially-available cartridge will be executed if it is determined that a cartridge dedicated to the flat-rate service is not mounted.

Further, if it is determined in S602 that a cartridge dedicated to the flat-rate service is mounted, the CPU 20 starts printing based on a job by use of the cartridge (S604). In S604, if printing is started, the counting part 40 starts counting the number of printing sheets. Then, each time the counting part 40 counts, the CPU 20 adds the counted value of the counting part 40 to the number of printing sheets in the offline print processing, which is stored in the data memory 24, and determines whether or not this sum-up value has reached the set upper limit value (S606).

Here, in the online print processing, the number of printing sheets in the offline print processing is initialized in S510. Therefore, in a case where the latest print processing prior to the offline print processing being executed is the online print processing, the number of printing sheets in the offline print processing is "0", so the sum-up value in S606 matches the counted value. On the other hand, in a case where the latest print processing prior to the offline print processing being executed is the offline print processing, the number of printing sheets in the offline print processing is "n (n is a natural number)", so the sum-up value in S606 is a value obtained by adding the counted value to "n". Note that, as will be described in detail later, the set upper limit value is the first value or the second value, which is output from the server 16.

If it is determined in S606 that the sum-up value of the number of printing sheets has reached the upper limit value, the CPU 20 restricts the printing, that is, stops the printing (S608), and ends the offline print processing with, for example, a notification that no more printing can be performed in the offline state. Thereby, the print processing is ended. Note that, in a case where printing is restricted in the offline print processing, the server 16 will be provided, at a predetermined timing where the printing apparatus 18 is in the online state, with a notification that the printing in the offline print processing was restricted, together with the printing information. Then, for example, the server 16 determines whether or not it is possible to continue utilizing the flat-rate service, based on the notification and the printing information, and outputs this determination result to the printing apparatus 18. In this case, if the printing in the offline print processing is restricted, the printing apparatus 18 restricts the online print processing and the offline print processing until receiving the determination regarding the continuation of the utilization of the flat-rate service from the server 16.

Further, if it is determined in S606 that the sum-up value has not reached the upper limit value, whether or not the printing based on the job is ended will be determined (S610), and, if it is determined that the printing is not ended, the processing returns to S606. Further, if it is determined in S610 that the printing is ended, the printing information is saved in the data memory 24 (S612), and the offline print processing will be ended. Thereby, the print processing is ended. In S612, for example, the sum-up value is updated to the value of the number of printing sheets in the offline print processing, which is saved in the data memory 24.

The printing information saved in the data memory 24 is sent to the server 16 at a timing where the printing apparatus 18 is in the online state and where there is no effect on the operation being executed. Alternatively, it is also possible that the printing information is sent at a timing of sending information to the server 16 during the online print processing (S508, etc.). Note that, after the printing information is sent, the number of printing sheets in the offline print processing is initialized.

Update Processing

As described above, in the offline print processing, the upper limit value is set for the number of printing sheets, so that printing cannot be continuously performed with no limitation without notifying the server 16 of the printing information including the number of printing sheets of the offline print processing. Then, if the number of printing sheets in the offline print processing reaches the upper limit value, the printing is restricted. Note that such a function is for making it possible to apply the upper limit number of sheets, which is set for a flat-rate service in the first place, to the offline state in which communication between the printing apparatus 18 and the server 16 is impossible.

However, there is a case in which, due to a predetermined condition such as maintenance of the server 16, the printing apparatus 18 is turned into the offline state in which the communication with the server 16 is impossible. A variety of upper limit numbers of printing sheets for the offline state can be applied. For example, the same number of printing sheets allowed for one month in the flat-rate service or a smaller or greater number of printing sheets thereof can be set. For example, in a case where the number of printing sheets allowed in the flat-rate service is 50 sheets per month, 25 sheets (corresponding to the first value) can be set for the offline print processing. However, for example, it is assumed that the printing apparatus is turned into the offline state due to server maintenance when the user originally planned to print 40 sheets in the online state in the month. In this case, since the printing is managed with the smaller number of printing sheets (25 sheets) during the offline state, the user may not be able to perform the printing as intended.

Therefore, in the present embodiment, in a case where it is known in advance that the printing apparatus 18 will be turned into the offline state due to server maintenance or the like, the upper limit value of the number of printing sheets in the offline print processing can be updated to the second value, which is a greater value.

Specifically, if a scheduled maintenance time period is input, the server 16 outputs the second value, which is held in advance, to the printing apparatus 18 at a predetermined timing prior to the start time of the maintenance. For example, the second value is set greater than the first value. Then, if the printing apparatus 18 obtains the second value, the printing apparatus 18 updates the upper limit value, which is stored in the data memory 24, from the first value to the second value. Note that, if the predetermined timing for outputting the second value from the server 16 to the printing apparatus is ahead of the start of maintenance by a predetermined time period, the printing apparatus 18 immediately updates the upper limit value to the second value. Note that it is assumed that the predetermined time period is a time period with which the printing by the flat-rate service is not affected or not affected much even though the upper limit value is updated to the second value. Further, if the above-described predetermined timing is sufficiently ahead of the maintenance start time, the server 16 outputs the maintenance start time together with the second value. Then, the printing apparatus 18 updates the upper limit value to the second value immediately before the maintenance start time.

Figure 7:
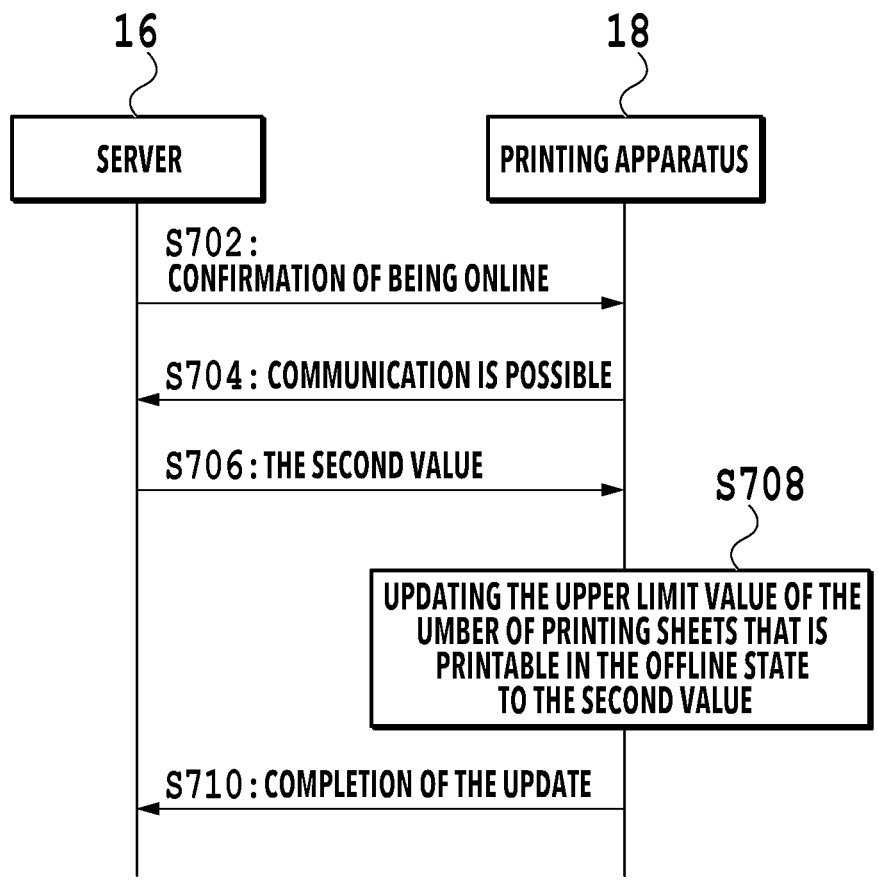
FIG. 7 is a sequence diagram of update processing in the first embodiment.

With reference to FIG. 7, updating of the upper limit value will be explained in detail. FIG. 7 is a sequence diagram of the update processing for updating the upper limit value. Note that the symbol "S" in the explanation of each process means that it is a step in the sequence.

First, when the maintenance time period is input to the server 16, the server 16 confirms whether or not the printing apparatus 18 is in the online state (S702). That is, in S702, a signal for confirming whether or not the printing apparatus 18 is in the online state is output from the server 16. In a case of being in the online state, the printing apparatus 18 receives the above-described signal and notifies the server 16 that the communication is possible (S704). Note that the server 16 determines that the printing apparatus 18 is in the offline state if the server 16 does not receive a notification that the communication is possible from the printing apparatus 18 although a certain period of time elapses after outputting the signal for confirming whether or not the printing apparatus 18 is in the online state, and then the process of S702 will be performed again at an interval of a certain period of time.

Upon receiving the notification that the communication is possible, the server 16 outputs the second value to the printing apparatus 18 (S706). That is, when the server 16 and the printing apparatus 18 can communicate with each other, the server 16 outputs the upper limit value for the printing by the printing apparatus 18 in the offline state to the printing apparatus 18. Note that, in the case of being sufficiently ahead of the maintenance start time, the maintenance time period is output together with the second value. In the case of being ahead of the start of maintenance by a predetermined time period, only the second value is output.

Upon receiving the second value, the printing apparatus 18 updates the upper limit value to the second value (S708). That is, if the printing apparatus 18 receives the maintenance time period together with the second value, the upper limit value is updated to the second value at the time ahead of the start of the maintenance by a predetermined time period or in accordance with the maintenance start time. That is, the printing apparatus 18 starts utilizing the second value, based on the maintenance start time notified from the server 16. Further, if the printing apparatus 18 receives only the second value, the upper limit value is immediately updated to the second value. If the upper limit value is updated to the second value, the printing apparatus 18 notifies the server 16 that the update of the upper limit value is completed (S710).

The maintenance time period which is input to the server 16 includes at least the time to start the maintenance. In a case where the maintenance start time and end time are input, the printing apparatus 18 sets the upper limit value to the second value during the time period which is output from the server 16, and, after the maintenance time period ends, the upper limit value is returned from the second value to the first value. That is, the printing apparatus 18 stops utilizing the second value, based on the maintenance end time notified from the server 16. Further, in a case where only the maintenance start time is input, the server 16 notifies the printing apparatus 18 of the end of the maintenance when the maintenance is ended. Upon receiving this notification, the printing apparatus 18 returns the upper limit value from the second value to the first value.

As explained above, in the printing system 10, when the printing apparatus 18 is turned into the offline state due to a predetermined condition such as maintenance of the server 16, the upper limit of the number of printing sheets for the offline time is changed from the upper limit value in the offline time of a condition other than the predetermined condition. For example, by changing the upper limit value to become greater, it is possible to perform more printing when the printing apparatus 18 becomes unable to communicate with the server 16, as compared with the normal offline time which depends on a change in the communication environment on the user side, etc. Therefore, even if the printing apparatus 18 is turned into the offline state due to server maintenance or the like, the printing by the printing apparatus 18 can be appropriately managed.

Note that such a change of the upper limit number of sheets in the online state as in FIG. 7 can be performed at a given timing. For example, the change may be performed on a predetermined date of each month (for example, the first day of each month). In this case, for example, the server 16 sets the upper limit number of sheets for the online state of the printing apparatus 18 and also notifies the printing apparatus 18 of the upper limit number of printing sheets for the offline state. Further, it is also possible that, for example, in a case where server maintenance is scheduled in the month, the server administrator sets a greater number of sheets than usual as the upper limit number of printing sheets for the offline state, so that the printing apparatus 18 is notified of the setting.

Second Embodiment

Next, with reference to FIG. 8 through FIG. 11, an explanation will be given of the printing system according to the second embodiment. Note that, in the following explanation, the same or corresponding configurations as those of the first embodiment described above are assigned with the same signs as those used in the first embodiment, so as to omit the detailed explanations thereof.

The second embodiment is different from the above-described first embodiment in that the printing by the flat-rate service is managed based on the printing area. For example, in a case where a printing apparatus capable of printing on a large-format print medium or a printing apparatus using roll paper is used as the printing apparatus 18, it may be difficult to manage the printing according to the number of printing sheets. Specifically, in a printing apparatus using roll paper, it is relatively difficult to accurately count the printing amount of printing by use of consumable parts as the number of printing sheets. Further, as for a printing apparatus capable of printing on a large-format print medium, in a case where printing is performed on print media in different sizes, the printing amount may not depend on the number of printing sheets.

In the printing system 10 of the second embodiment, the CPU 20 counts the printing area in the printing apparatus 18. Specifically, the CPU 20 calculates and counts the printing area by use of the data for printing, which is obtained from the image memory 32 at the time of printing. Alternatively, the printing apparatus 18 is equipped with a reading part for reading a printed image, so that the CPU 20 calculates and counts the printing area, based on the information read by the reading part. Note that the above-described method for calculating the printing area is an example, and, in the present embodiment, various publicly-known techniques can be used as the method for calculating the printing area. The printing area counted in this way is included in the printing information, which is output to the server 16.

Further, the server 16 holds the third value (1st value) to be set as the upper limit value of the printing area that is printable when the printing apparatus 18 is turned into the offline state. Further, the server 16 holds the fourth value (2nd value) for updating the upper limit value of the printing area that is printable in the offline state when it is known in advance that the printing apparatus 18 will be in the offline state at the convenience of the management company side. The fourth value is set greater than the third value. The third value and the fourth value are values associated with a flat-rate service. For example, in a case where there are multiple flat-rate services having different service contents, the values are different depending on the types of the flat-rate services.

Figure 8:
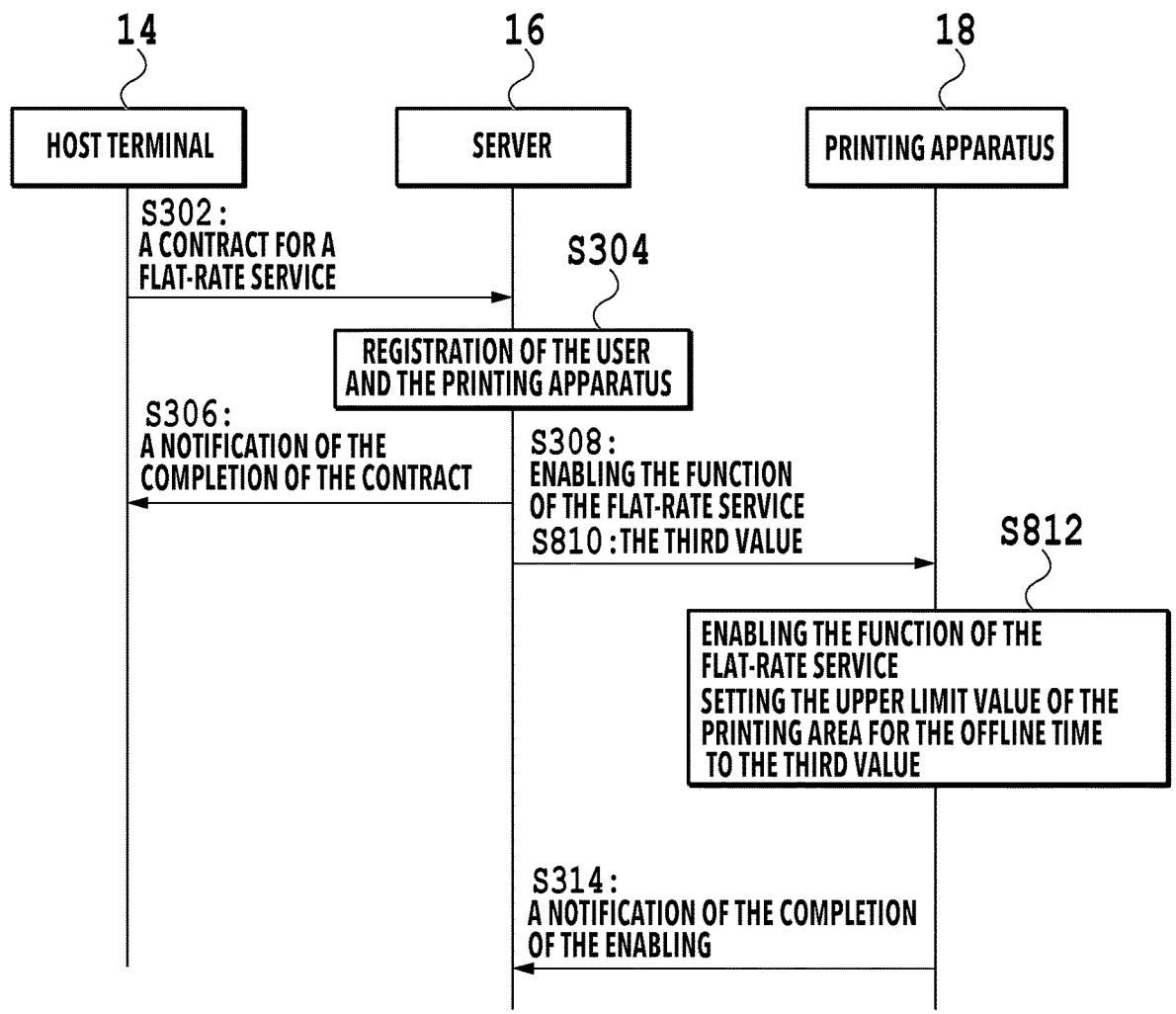
FIG. 8 is a sequence diagram of contract processing in the second embodiment.

Next, the contract processing to be executed in the printing system 10 according to the second embodiment will be explained. FIG. 8 is a sequence diagram of the update processing to be executed in a printing system according to the second embodiment. Note that, in FIG. 8, the same step number is used for the same process as that of the contract processing of FIG. 3. Further, in the explanation of the contract processing with reference to FIG. 8, the explanation of the same process as in FIG. 3 will be omitted as appropriate.

In the contract processing, after the notification that the contract is completed is provided from the server 16 to the host terminal 14 in S306, the server 16 outputs, to the printing apparatus 18, a command for enabling the service in S308 as well as the printing area that is printable in the offline state (S810). That is, in S810, the server 16 outputs, to the printing apparatus 18, the third value to be set as the upper limit value of the printing area in which the printing apparatus 18 can perform printing in the offline state.

Then, the printing apparatus 18 enables the function of the flat-rate service, based on the input information, and further sets the upper limit value of the printing area for the offline time (S812) and provides a notification that the enabling of the service is completed in S314. That is, in S812, the usage mode of the printing apparatus 18 is changed to the service mode, and the upper limit value of the printing area in which the printing apparatus 18 can perform printing in the offline state is set to the third value, which is input from the server 16. In the following explanation, the upper limit value of the printing area for the offline time, which is set for the printing apparatus 18, is simply referred to as an "area upper limit value" as appropriate.

Figure 9:
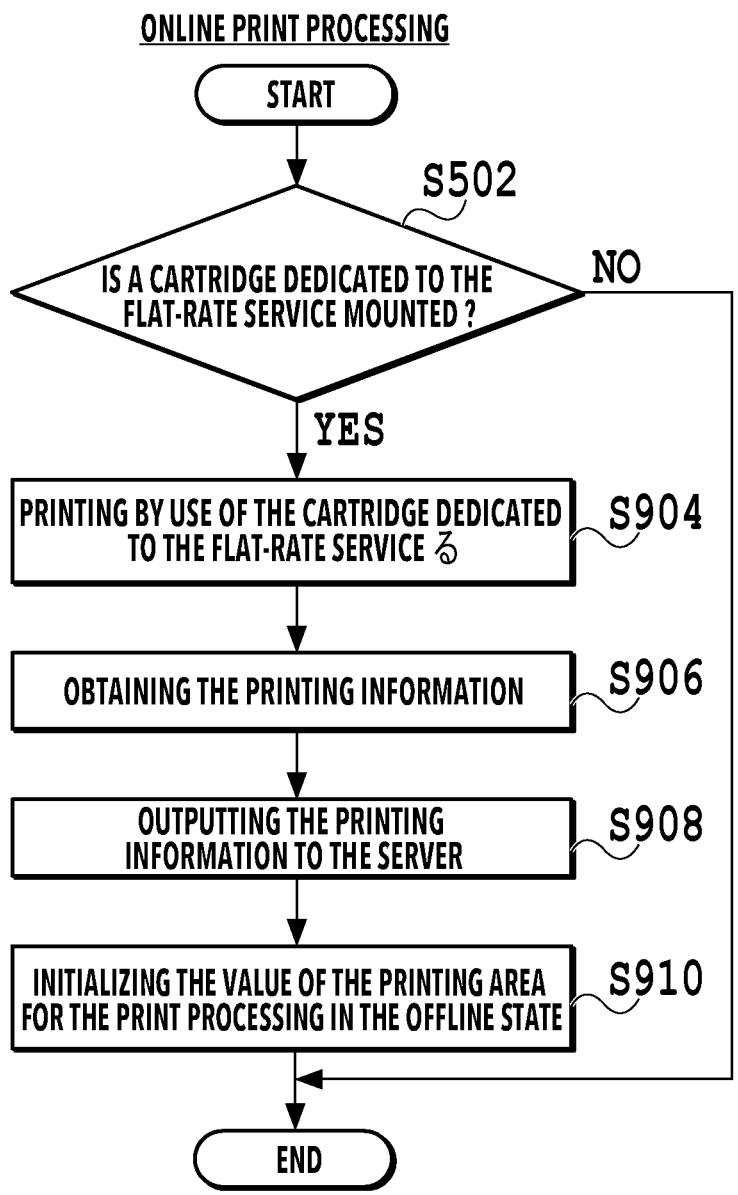
FIG. 9 is a flowchart of online print processing in the second embodiment.

Next, the online print processing to be executed in the printing system 10 according to the second embodiment will be explained. FIG. 9 is a flowchart illustrating the details of the online print processing, which is a subroutine of the print processing that is executed in a printing system according to the second embodiment. In FIG. 9, the same step number is used for the same process as that of the online print processing of FIG. 5. In the explanation of the online print processing with reference to FIG. 9, the explanation of the same process as in FIG. 5 will be omitted as appropriate.

In the online print processing, if it is determined in S502 that a cartridge dedicated to the flat-rate service is mounted, printing based on a job will be performed by use of the cartridge (S904). In S904, together with the start of printing, the CPU 20 starts counting the printing area. Upon completion of the printing, the CPU 20 obtains the printing information including the counted printing area (S906) and outputs the obtained printing information to the server 16 (S908). The printing area in the printing information obtained in S906 is a value of the sum of the printing area in which the printing was performed in S904 and the printing area for the offline print processing (which will be described later) stored in the data memory 24. The printing area for the offline print processing is the printing area in which printing has been performed in the later-described offline print processing.

Thereafter, the CPU 20 initializes the value of the printing area for the offline print processing which is stored in the data memory 24 (S910) and ends this online print processing. Thereby, the print processing is ended.

Figure 10:
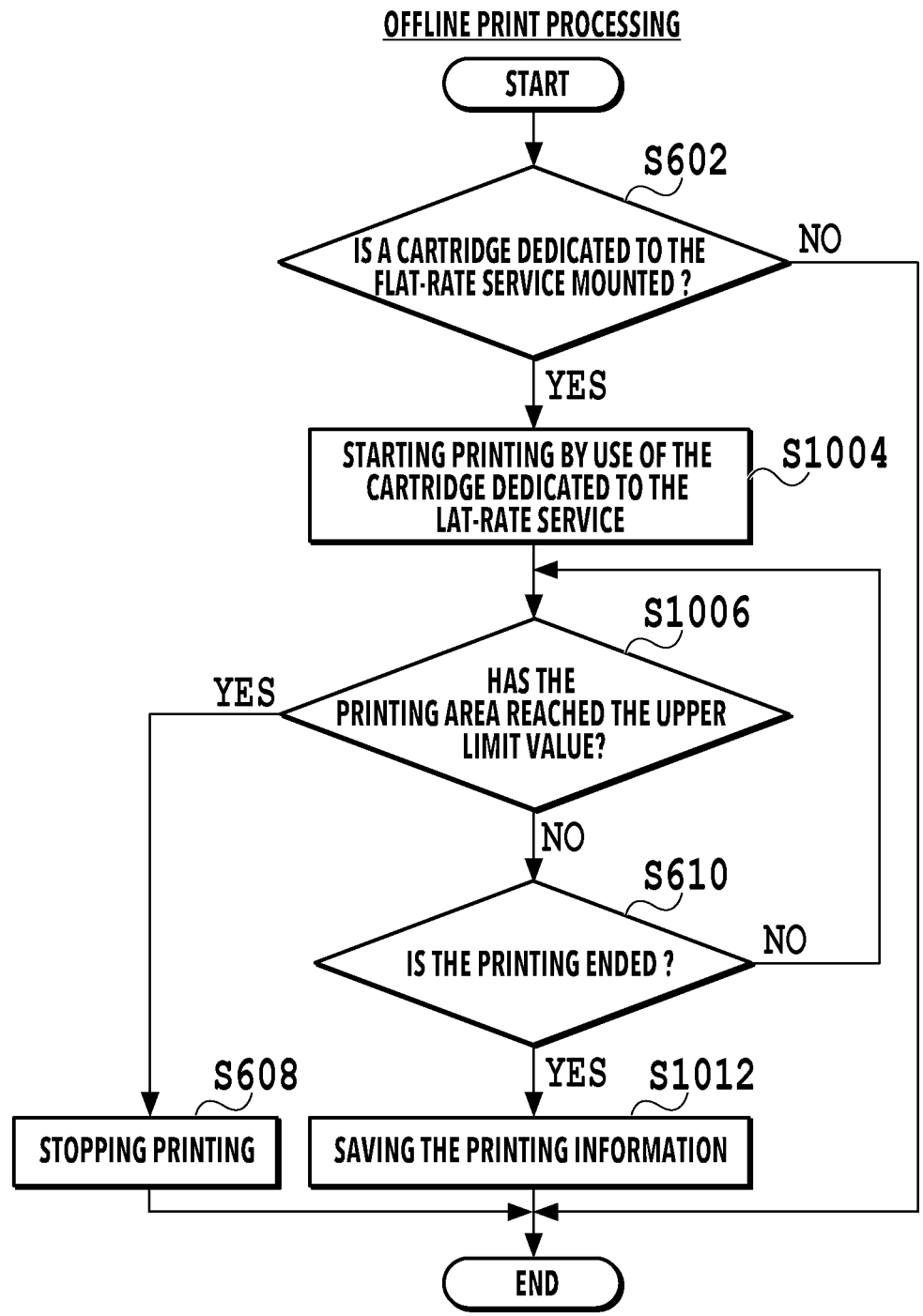
FIG. 10 is a flowchart of offline print processing in the second embodiment.

Next, the offline processing to be executed in the printing system 10 according to the second embodiment will be explained. FIG. 10 is a flowchart illustrating the details of the offline print processing, which is a subroutine of the print processing that is executed in a printing system according to the second embodiment. In FIG. 10, the same step numbers are used for the same processes as those of the offline print processing of FIG. 6. In the explanation of the offline print processing with reference to FIG. 10, the explanations of the same processes as in FIG. 6 will be omitted as appropriate.

In the offline print processing, if it is determined in S602 that a cartridge dedicated to the flat-rate service is mounted, the CPU 20 starts printing based on a job by use of the cartridge (S1004). In S1004, when the printing is started, the CPU 20 starts counting the printing area. Then, the CPU 20 adds the counted value to the printing area for the offline print processing, which is stored in the data memory 24, and determines whether or not this sum-up value has reached the set area upper limit value (S1006).

If it is determined in S1006 that the sum-up value has not reached the area upper limit value, whether or not the printing based on the job is ended will be determined in S610, and, if it is determined that the printing is ended, the printing information will be saved in the data memory 24 (S1012) and this offline print processing will be ended. Thereby, the print processing is ended. In S1012, the sum-up value is updated to the value of the printing area for the offline print processing, which is saved in a data memory.

Figure 11:
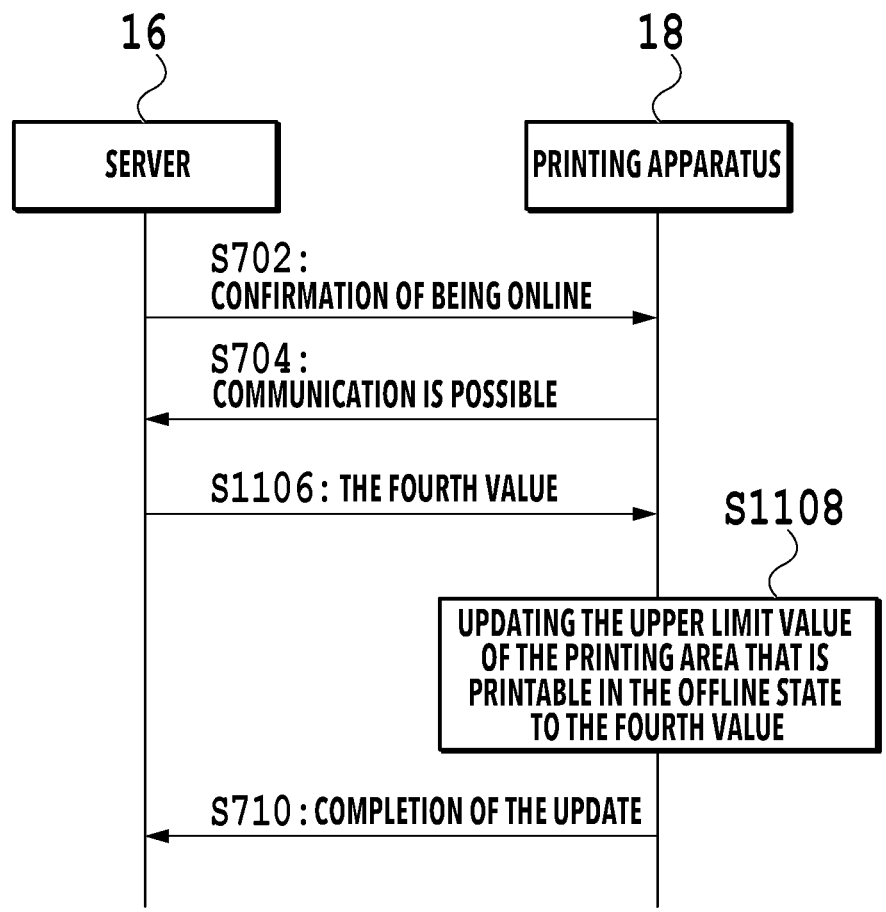
FIG. 11 is a sequence diagram of update processing in the second embodiment.

Next, the update processing to be executed in the printing system 10 according to the second embodiment will be explained. FIG. 11 is a flowchart illustrating details of the update processing executed in a printing system according to the second embodiment. In FIG. 11, the same step numbers are used for the same processes as those of the update processing of FIG. 7. In the explanation of the update processing with reference to FIG. 11, the explanations of the same processes as in FIG. 7 will be omitted as appropriate.

In the update processing, in a case of receiving a notification that the communication is possible from the printing apparatus 18 in S704, the server 16 outputs the fourth value (S1106). That is, in S1106, in a case of being sufficiently ahead of the maintenance time period, the maintenance time period is output together with the fourth value. In a case of being ahead of the start of maintenance by a predetermined time period, only the fourth value is output.

Upon receiving the fourth value, the printing apparatus 18 updates the area upper limit value from the third value to the fourth value (S1108). That is, in S1108, if the printing apparatus 18 receives the maintenance time period together with the fourth value, the area upper limit value is updated to the fourth value at the time ahead of the start of the maintenance by a predetermined time period or in accordance with the maintenance start time. Further, if the printing apparatus 18 receives only the fourth value, the area upper limit value is immediately updated to the fourth value.

If the area upper limit value is updated to the fourth value, the printing apparatus 18 notifies the server 16 in S710 that the update is completed.

As explained above, in the printing system 10 according to the present embodiment, the printing in the offline time which is caused by maintenance of the server 16 is managed based on the printing area. Accordingly, in the printing system 10, in addition to the same effects as in the printing system according to the above-described first embodiment, the printing apparatus 18 can accurately manage the printing amount even in a form where it is difficult to manage the printing amount with the number of printing sheets.

Other Embodiments

Note that the above-described embodiments may be modified as shown in the following (1) through (6).

(1) In the above-described embodiments, although the number of printing sheets and the printing area are used as the predetermined information representing the printing amount of the printing utilizing consumable parts in order to manage the printing in the offline time, there is not a limitation as such. That is, as the predetermined information representing the printing amount to be used for managing the printing in the offline time, for example, it is also possible to use the ink ejection amount or use the offline time period. Various publicly-known techniques can be used for the configuration for counting the ink ejection amount and the offline time period. Note that it is also possible to use the number of printing sheets, the printing area, and the ink ejection amount for managing the printing in the online time, not only for managing the printing in the offline time.

Further, it is also possible to have such a configuration in which four elements, that is, the number of printing sheets, printing area, ink ejection amount, and offline time period can be selected as the predetermined information for managing the printing in the offline time, so that the printing in a flat-rate service is managed based on the selected element. Further, it is also possible to manage the printing in the offline time, based on at least two of the above-described four elements. In this case, the printing may be restricted at the point in time where one of the multiple elements reaches the upper limit value that is set for the element. Alternatively, the printing may be restricted at the point in time where all of the multiple elements reach the upper limit values that are set for the respective elements.

Further, it is also possible that the element for managing the printing in the online time and the element for managing the printing in the offline time are different. For example, the printing is managed with the number of printing sheets for the online time and the printing is managed with the printing area for the offline time. In this case, in the update processing, if the online state is confirmed, a command for enabling the function of counting the printing area and the fourth value which is set as the area upper limit value in the offline time due to server maintenance are output from the server 16 to the printing apparatus 18. Thereafter, the printing apparatus 18 disables the function of counting the number of printing sheets and also enables the function of counting the printing area. Further, the printing apparatus 18 updates the upper limit value, for which the first value is set, to the fourth value as the area upper limit value. Further, for example, it is also possible that the printing is managed with the number of printing sheets for the online time and the printing is managed with the number of printing sheets and the ink ejection amount in the offline time.

In this way, by having a configuration in which multiple elements can be used as the elements for managing the printing, it is possible to appropriately manage the printing in a flat-rate service according to the type of the printing apparatus 18.

(2) In the above-described embodiments, although the first value, the second value, the third value, and the fourth value are explained as fixed values, there is not a limitation as such, and they may be changed according to the number of remaining printing sheets that are printable in a flat-rate service. That is, for example, it is also possible that the first value is a value of a predetermined ratio to the number of remaining printing sheets that are printable by use of the flat-rate service, and the second value is a value that is several percent greater than the first value. Further, it is also possible that the third value is a value of a predetermined ratio to the remaining printing area that is printable by use of the flat-rate service, and the fourth value is a value that is several percent greater than the third value. In these cases, in S606 and S1006 of the offline print processing, for determining whether or not the upper limit value has been reached, the number of printing sheets and the printing area in the offline time, which are stored in the data memory 24, are not added, but the upper limit value is compared to the counted value only.

(3) Although not particularly described in the above-described embodiments, a notification indicating that printing can not be performed since a cartridge dedicated to a flat-rate service is not mounted, etc., is executed via, for example, a display part (not illustrated in the drawings) installed on the printing apparatus 18, a host terminal, etc. Further, although not particularly described in the above-described embodiments, it is also possible that the number of printing sheets or the printing area are not counted for such printing other than the printing based on a job as maintenance print in a case of a nozzle check for checking the ink ejection state of the print part 30, for example.

(4) In the above-described embodiments, although the upper limit value of the number of printing sheets or the printing area that are printable in the offline time is updated in a case of being turned into offline at the convenience of the management company side, such as server maintenance, there is not a limitation as such. That is, the techniques according to the above-described embodiments can also be applied even in a case of being turned into offline at the convenience of the user side. For example, in a case of satisfying a specific condition that is acceptable on the management company side, the user may input the time period to become offline in advance or, with an input for becoming offline from now, the above-described upper limit value may be updated via the server in response to the input.

(5) Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

(6) The above-described embodiments and various forms shown in (1) through (5) may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-135739, filed Aug. 11, 2020, which is hereby incorporated by reference herein in its entirety.

What is claimed is:

1. A printing system comprising:
a printing apparatus configured to perform printing by utilizing a consumable part; and
a server configured to manage the printing apparatus,
wherein the printing system restricts printing performed by the printing apparatus in a case where predetermined information, which represents a printing amount of the printing by utilizing the consumable part, reaches a set 1st value during printing in a state where communication between the server and the printing apparatus is impossible,
wherein the server outputs a 2nd value, which is different from the 1st value, to the printing apparatus in a state where the communication with the printing apparatus is possible,
wherein, if the 2nd value is input from the server, the printing apparatus restricts the printing in a case where the predetermined information reaches the 2nd value during printing in a state where the communication with the server is impossible, and
wherein, in a case where a time period related to maintenance of the server is input, the server outputs the 2nd value to the printing apparatus, based on the time period.

2. The printing system according to claim 1,
wherein the predetermined information corresponds to the number of printing sheets.

3. The printing system according to claim 1,
wherein the predetermined information corresponds to a printing area.

4. The printing system according to claim 1,
wherein the predetermined information corresponds to a time period in which the communication between the server and the printing apparatus is impossible.

5. The printing system according to claim 1,
wherein the printing apparatus is an inkjet printing apparatus, and
wherein the predetermined information corresponds to an ink ejection amount.

6. The printing system according to claim 1,
wherein the printing apparatus is an inkjet printing apparatus, and
wherein the number of printing sheets, a printing area, a time period in which the communication between the server and the printing apparatus is impossible, or an ink ejection amount can be selected as the predetermined information.

7. The printing system according to claim 1,
wherein the printing apparatus is an inkjet printing apparatus, and
wherein the predetermined information corresponds to at least two of the number of printing sheets, a printing area, a time period in which the communication between the server and the printing apparatus is impossible, or an ink ejection amount, and the 2nd value is an upper limit value provided for each of the predetermined information.

8. The printing system according to claim 7,
wherein, in a case where the communication with the server becomes impossible, the printing apparatus restricts printing if either one of the predetermined information reaches the 2nd value.

9. The printing system according to claim 7,
wherein, in a case where the communication with the server becomes impossible, the printing apparatus restricts printing if all of the predetermined information reach the 2nd value.

10. The printing system according to claim 1,
wherein, in the printing apparatus, the predetermined information for restricting printing based on the 2nd value and the predetermined information for restricting printing based on the 1st value are different.

11. The printing system according to claim 1,
wherein, in a case where a time period related to maintenance of the server is input, the server further provides the printing apparatus with a notification based on the time period, and
wherein the printing apparatus restricts printing in the state where the communication with the server is impossible by utilizing the 2nd value in a time period based on the notification.

12. The printing system according to claim 1,
wherein the 1st value and the 2nd value are fixed values.

13. The printing system according to claim 1,
wherein the 1st value and the 2nd value change according to a remaining amount of possible printing.

14. A control method for a printing system, the printing system including:
- a printing apparatus configured to perform printing by utilizing a consumable part; and
- a server configured to manage the printing apparatus,
- wherein the printing system controls printing performed by the printing apparatus in a case where predetermined information, which represents a printing amount of the printing by utilizing the consumable part, reaches a set 1st value during printing in a state where the communication between the server and the printing apparatus is impossible, the control method comprising:
- outputting, by the server, a 2nd value, which is different from the 1st value, to the printing apparatus in a state where the communication with the printing apparatus is possible,
- if the 2nd value is input from the server, restricting, by the printing apparatus, the printing in a case where the predetermined information reaches the 2nd value during printing in a state where the notification to the server is impossible, and
- wherein, in a case where a time period related to maintenance of the server is input, the server outputs the 2nd value to the printing apparatus, based on the time period.

* * * * *